United States Patent
Chung

(10) Patent No.: US 9,656,612 B2
(45) Date of Patent: May 23, 2017

(54) APPARATUS FOR FASTENING PRESSURE VESSEL OF VEHICLE AND PRESSURE VESSEL FASTENING SYSTEM

(71) Applicant: Hyundai Motor Company, Seoul (KR)

(72) Inventor: Jae Han Chung, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/930,267

(22) Filed: Nov. 2, 2015

(65) Prior Publication Data

US 2016/0325692 A1    Nov. 10, 2016

(30) Foreign Application Priority Data

May 6, 2015    (KR) .................. 10-2015-0062871

(51) Int. Cl.
*A47K 1/08*    (2006.01)
*B60R 11/00*    (2006.01)

(52) U.S. Cl.
CPC ....... *B60R 11/00* (2013.01); *B60R 2011/0071* (2013.01)

(58) Field of Classification Search
CPC .................. B60G 11/00; B60R 2011/0071
See application file for complete search history.

(56) References Cited

U.S. PATENT DOCUMENTS

| | | | | |
|---|---|---|---|---|
| 4,810,890 A | * | 3/1989 | Blum ...................... | G21F 5/08 250/506.1 |
| 4,886,256 A | * | 12/1989 | Nishiyama ............ | B60G 11/52 267/221 |
| 5,251,732 A | * | 10/1993 | Bruning ................ | B60M 1/302 191/22 DM |
| 6,896,234 B2 | * | 5/2005 | Henley .................. | A61B 6/035 238/10 R |
| 2005/0121572 A1 | | 6/2005 | Mascarenhas et al. | |
| 2010/0051625 A1 | * | 3/2010 | Dandalides ............. | B60G 7/02 220/562 |
| 2015/0165961 A1 | * | 6/2015 | Miller .................. | B60P 7/0807 410/101 |

FOREIGN PATENT DOCUMENTS

| | | |
|---|---|---|
| JP | H10-278601 A | 10/1998 |
| JP | 2002-122297 A | 4/2002 |
| JP | 2005-225477 A | 8/2005 |
| JP | 2006-322584 A | 11/2006 |
| JP | 2014-129031 A | 7/2014 |
| KR | 2009-0116907 A | 11/2009 |

* cited by examiner

*Primary Examiner* — Amy Sterling
(74) *Attorney, Agent, or Firm* — Mintz Levin Cohn Ferris Glovsky and Popeo, P.C.; Peter F. Corless

(57) ABSTRACT

An apparatus for fastening a pressure vessel of a vehicle is arranged to fix the pressure vessel to a vehicle body, where the pressure vessel includes a cylindrical body, dome-shaped curved portions at both ends of the cylindrical body, and bosses at distal ends of the curved portions. The apparatus is arranged to receive the pressure vessel, and further includes: elastic bodies disposed along circumferences of the curved portions of the pressure vessel to support surfaces of the curved portions and to be disposed on a virtual flat cross section vertically crossing the curved portions along the circumferences of the curved portions to support the curved portions of the pressure vessel in all directions; and a fixed structure having one side connected to the elastic bodies and the other side connected to the vehicle body.

10 Claims, 10 Drawing Sheets

APPARATUS FOR FASTENING PRESSURE VESSEL OF VEHICLE AND PRESSURE VESSEL FASTENING SYSTEM

CROSS REFERENCE TO RELATED APPLICATION

This application claims under 35 U.S.C. §119(a) the benefit of Korean Patent Application No. 10-2015-0062871, filed on May 6, 2015, which is incorporated by reference herein.

BACKGROUND (a) Technical Field

The present invention relates to an apparatus for fastening a pressure vessel of a vehicle and a pressure vessel fastening system for stably mounting the pressure vessel in the vehicle.

(b) Description of the Related Art

Alternative fuel gas vehicles (for example, fuel cell vehicles or compressed natural gas vehicles) have different structures of storage systems depending on a type of fuel gas to be stored. For example, storage of compressed gas has been in the limelight in consideration of costs, weight, and simplification of the storage system. However, gaseous fuel has a low energy storage density, and therefore to secure a sufficient driving distance, there is a need to increase a size of a storage vessel and a storage pressure so as to increase the amount of storage. An automobile has limited space for a gas storage system and thus options may be limited with respect to increasing a size of a storage vessel. As a result, methods for increasing a storage pressure have been considered in order to safely store high-pressure gas.

A pressure vessel is typically fastened to a vehicle body, in which the fastening scheme is divided into a scheme of fastening a pressure vessel while enclosing a body part of the pressure vessel and a scheme of fastening a boss of the pressure vessel. Each fastening scheme may fasten the vehicle body and the pressure vessel using a metallic rigid clamp, but has a structure which may not absorb an amount expanded in a radial direction or a length direction at the time of charging. In the case of the scheme of fastening the pressure vessel while enclosing the body of the pressure vessel, a bracket which is not equal to a deformation of the storage vessel may be damaged, and in the case of the scheme of fastening the boss, a load is applied to a weak part (interface between a metal boss and a plastic liner) of a type 4 pressure vessel, and thus the storage vessel is likely to be damaged early.

Therefore, there is a need for a system having a fastening structure which maintains to fastening performance between the pressure vessel and the vehicle, absorbs an expansion of the vessel in each direction at the time of charging and restoration to its original size of zero pressure, and also absorbs a dimension tolerance occurring at the time of the manufacturing of the vessel so as to reduce the possibility of damage to the vessel due to increased stress or fatigue of the fastened portion.

The matters described as the related art have been provided only for assisting in the understanding for the background of the present invention and should not be considered as corresponding to the related art known to those skilled in the art.

SUMMARY

An object of the present invention is to provide a method for reducing a risk of damage of a fastened bracket or reduction of useful life of a pressure vessel due to stress concentration or increased fatigue at specific parts of a body or a boss of a storage vessel, and a structure to be stably fastened to a vehicle body while absorbing deformation of a vessel due to expansion and contraction of the vessel in a length direction and a radial direction.

According to an exemplary embodiment of the present invention, there is provided an apparatus for fastening a pressure vessel of a vehicle, in which the pressure vessel includes a cylindrical body, dome-shaped curved portions at both ends of the cylindrical body, and bosses at distal ends of the curved portions and is fixed to a vehicle body, the apparatus including: elastic bodies configured to be disposed along circumferences of the curved portions of the pressure vessel to support surfaces of the curved portions and to be disposed on a virtual flat cross section vertically crossing the curved portions along the circumferences of the curved portions to support the curved portions of the pressure vessel in all directions; and a fixed structure configured to have one side connected to the elastic bodies and the other side connected to the vehicle body.

As provided herein, the apparatus for fastening the pressure vessel preferably includes a plurality of elastic bodies. However, each of the plastic bodies has a similar structure, and thus for convenience will be referred to in the description herein as an "elastic body."

An elastic body (of the plurality of elastic bodies) may be configured to include a fixed part connected to the fixed structure and a support part supporting one of the curved portions, wherein the fixed part may have an upper end provided with a horizontal surface which is horizontal to a ground and a side end provided with a vertical surface which is vertical to the ground, the support part may be configured as a support curved surface which connects between an end of the horizontal surface and an end of the vertical surface by a curved line, and the support curved surface may contact the pressure vessel.

The vertical surface, the horizontal surface, and the support curved surface of the elastic body may form a closed cross section and a center of the elastic body may be provided with a void portion which is filled with a foam.

The fixed structure may include a band which penetrates through the elastic body or is coupled with an outer side of the elastic body and brackets coupled with the band to be fastened with the vehicle body.

The elastic body may be made of a composite material including a high strength fiber, the fiber of the composite material may be included in the elastic body in parallel in a circumferential direction of the elastic body, and an outer layer of the elastic body may be provided with a multi-directional woven fiber.

The band may be made of the composite material including a high strength fiber and the fiber of the band may be disposed in parallel in the circumferential direction of the band.

The horizontal surface of the elastic body may be disposed in a length direction of the pressure vessel, the vertical surface thereof may be disposed in the radial direction of the pressure vessel, and an inner side of the band may be coupled with the horizontal surface of the elastic body to support the pressure vessel.

The apparatus may further include: a dovetail-shaped mounting rail configured to be provided at the vehicle body and provided with grooves at a uniform interval, wherein one side of the mounting rail provided with grooves may be coupled with the brackets and the other side thereof may be coupled with the vehicle body.

The fixed structure may be provided with the band configured to penetrate through the elastic body or be coupled with an outer side of the elastic body to fasten the plurality of elastic bodies and the horizontal surface of the elastic body may be provided with a seating groove in which the band is seated and the seating groove may be configured of a lower surface portion which faces-contact the inner side of the band and a side portion which contacts the side of the band.

According to another exemplary embodiment of the present invention, there is provided a pressure vessel fastening system of a vehicle including: a pressure vessel configured to include a cylindrical body, dome-shaped curved portions at both ends of the body, and bosses at distal ends of the curved portions; elastic bodies configured to be disposed along circumferences of the curved portions of the pressure vessel to support surfaces of the curved portions and to be disposed on a virtual flat cross section vertically crossing the curved portions along the circumferences of the curved portions to support the curved portions of the pressure vessel in all directions; and a fixed structure configured to have one side connected to the elastic body and the other side connected to the vehicle body.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, exemplary embodiments of the present invention will be described with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
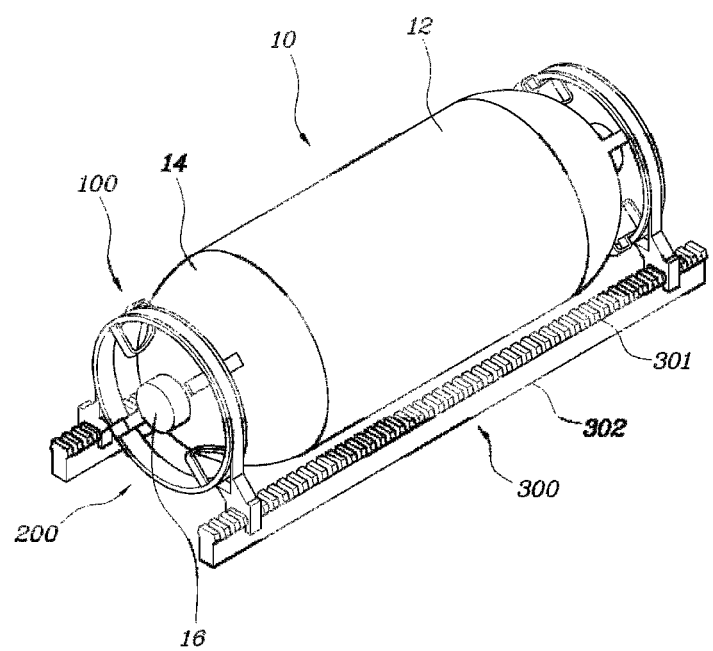
FIG. 1 is a perspective view of an apparatus for fastening a pressure vessel of a vehicle according to an exemplary embodiment of the present invention.
Figure 2:
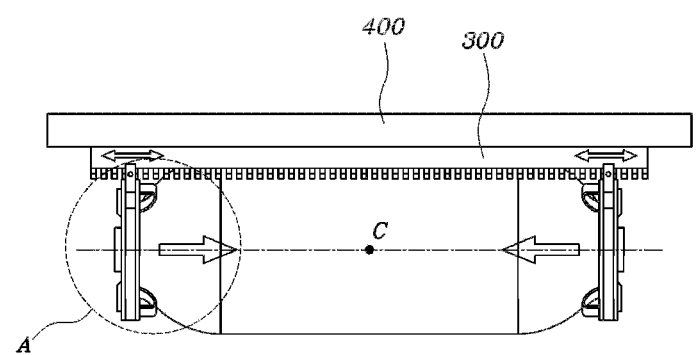
FIG. 2 is a side view of the apparatus for fastening a pressure vessel of a vehicle according to the exemplary embodiment of the present invention.
Figure 3:
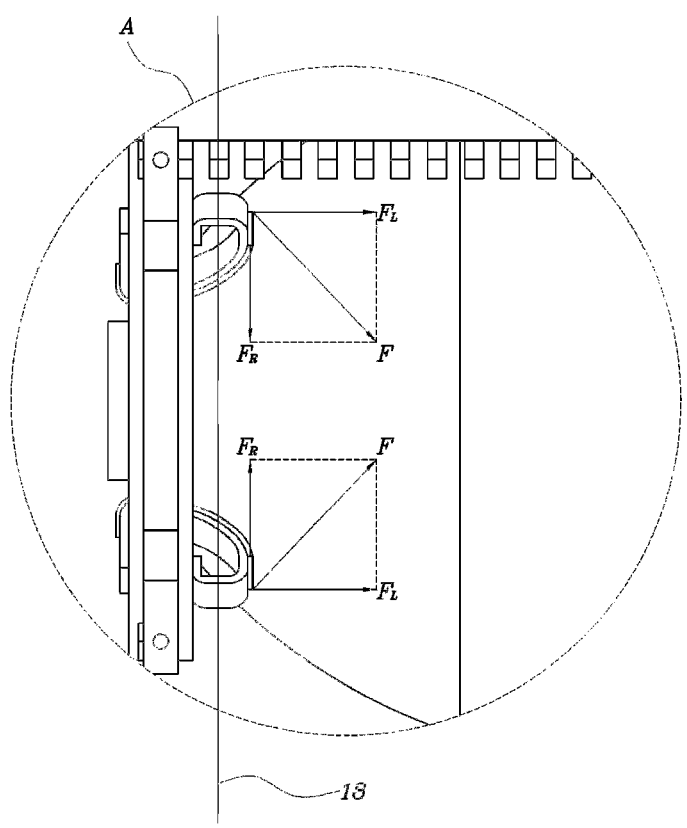
FIG. 3 is an enlarged view of portion A of the apparatus for fastening a pressure vessel of a vehicle illustrated in FIG. 2.
Figure 4:
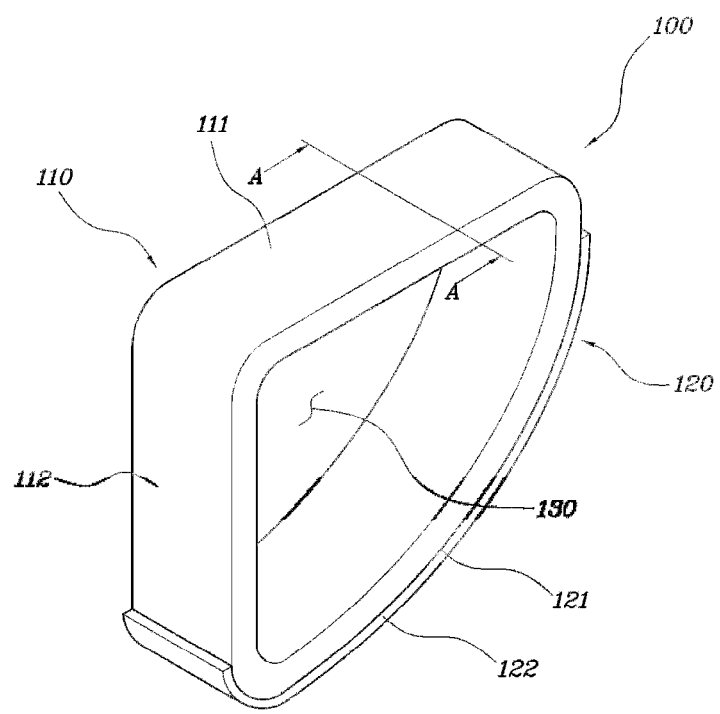
FIG. 4 is a perspective view of an elastic body included in the apparatus for fastening a pressure vessel of a vehicle according to the exemplary embodiment of the present invention.
Figure 5:
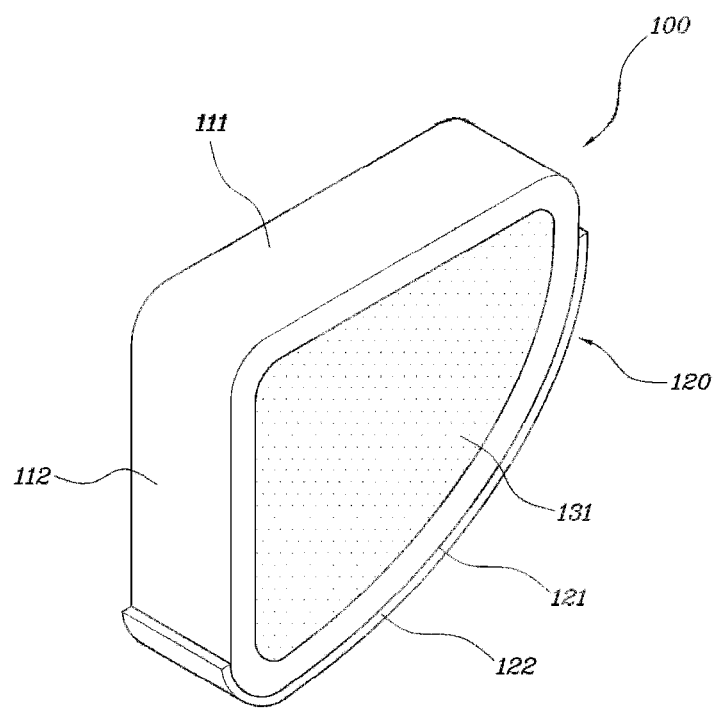
FIG. 5 is a diagram illustrating that a void portion of the elastic body according to the exemplary embodiment of the present invention illustrated in FIG. 4 is filled with a foam.
Figure 6:
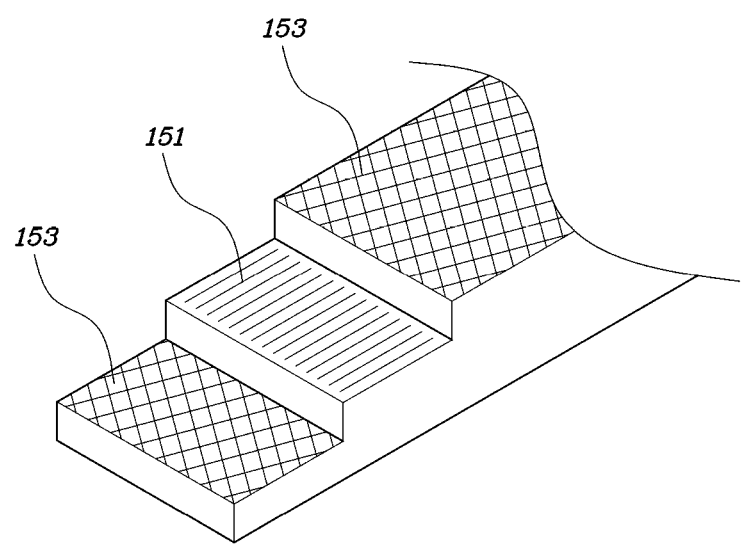
FIG. 6 is a cross-sectional view taken along the line A-A of the elastic body of the apparatus for fastening a pressure vessel of a vehicle according to the exemplary embodiment of the present invention illustrated in FIG. 4.
Figure 7:
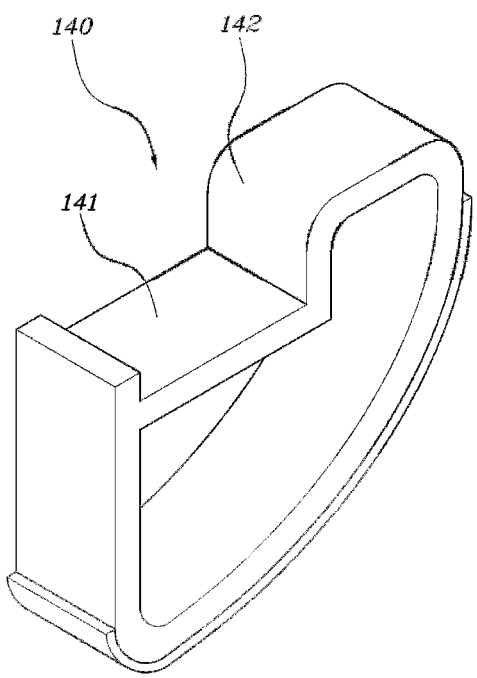
FIG. 7 is a perspective view of an elastic body included in an apparatus for fastening a pressure vessel of a vehicle according to another exemplary embodiment of the present invention.
Figure 8:
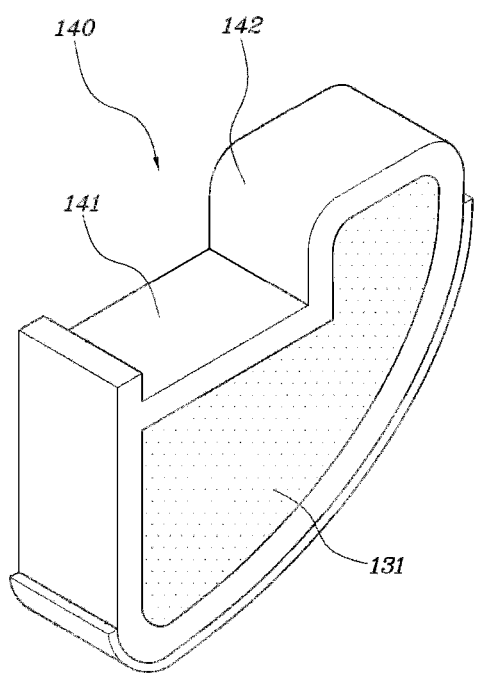
FIG. 8 is a diagram illustrating that a void portion of the elastic body according to another exemplary embodiment of the present invention illustrated in FIG. 7 is filled with a foam.
Figure 9:
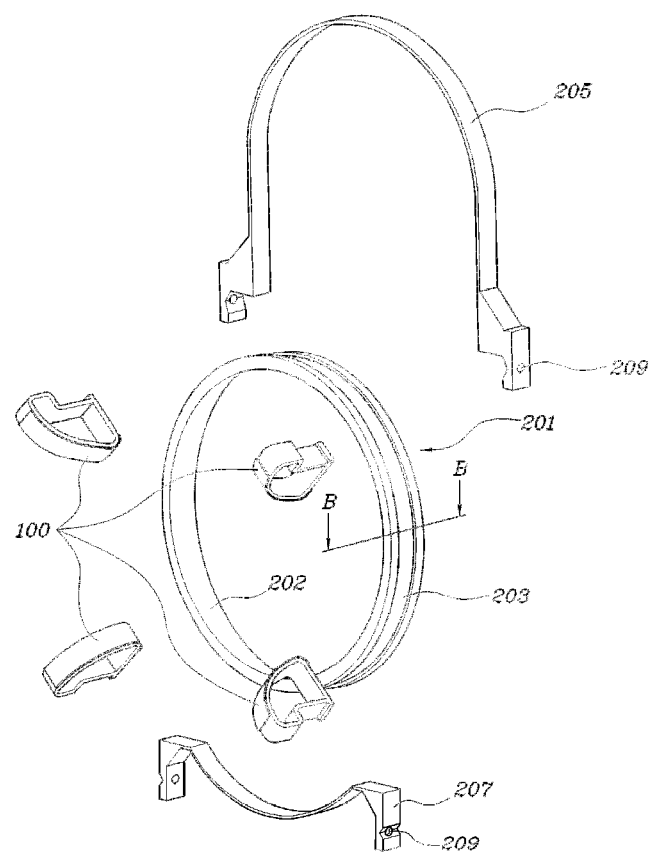
FIG. 9 is an exploded perspective view of the elastic body and a fixed structure of the apparatus for fastening a pressure vessel of a vehicle according to the exemplary embodiment of the present invention.

FIG. 1 is a perspective view of an apparatus for fastening a pressure vessel of a vehicle according to an exemplary embodiment of the present invention; FIG. 2 is a side view of the apparatus for fastening a pressure vessel of a vehicle according to the exemplary embodiment of the present invention; FIG. 3 is an enlarged view of portion A of the apparatus for fastening a pressure vessel of a vehicle illustrated in FIG. 2; FIG. 4 is a perspective view of an elastic body included in the apparatus for fastening a pressure vessel of a vehicle according to the exemplary embodiment of the present invention; FIG. 5 is a diagram illustrating that a void portion of the elastic body according to the exemplary embodiment of the present invention illustrated in FIG. 4 is filled with a foam; FIG. 6 is a cross-sectional view taken along the line A-A of the elastic body of the apparatus for fastening a pressure vessel of a vehicle according to the exemplary embodiment of the present invention illustrated in FIG. 4; FIG. 7 is a perspective view of an elastic body included in an apparatus for fastening a pressure vessel of a vehicle according to another exemplary embodiment of the present invention; FIG. 8 is a diagram illustrating that a void portion of the elastic body according to another exemplary embodiment of the present invention illustrated in FIG. 7 is filled with a foam; and FIG. 9 is an exploded perspective view of the elastic body and a fixed structure of the apparatus for fastening a pressure vessel of a vehicle according to the exemplary embodiment of the present invention.

An apparatus for fastening a pressure vessel of a vehicle according to the exemplary embodiment of the present invention can prevent a concentration of a load by absorbing deformation of a pressure vessel 10 at the time of charging and discharging and a tolerance at the time of the production of parts, to thereby prevent a reduction of useful life of the parts, facilitate assembly, and prevent a structure of a bracket from being separately changed even at the time of a change in design.

As illustrated in FIG. 1, an apparatus for fastening a pressure vessel of a vehicle according to the exemplary embodiment of the present invention, in which the pressure vessel 10 is configured to include a cylindrical body 12, dome-shaped curved portions 14 at both ends of the cylindrical body 12, and bosses 16 at distal ends of the curved portions 14 and is fastened to a vehicle body 400, includes: elastic bodies 100 configured to be disposed along circumferences of the curved portions 14 of the pressure vessel to support surfaces of the curved portions 14 and to be disposed on a virtual flat cross section 18 vertically crossing the curved portions 14 along the circumferences of the curved portions 14 to support the curved portions of the pressure vessel in all directions and a fixed structure 200 configured to have one side connected to the elastic bodies 100 and the other side connected to the vehicle body 400.

The apparatus for fastening a pressure vessel of a vehicle according to the exemplary embodiment of the present invention absorbs a contraction and an expansion in a radial direction and a length direction by a method for fastening the curved portion 14 of the pressure vessel using the elastic body 100 and the fixed structure 200, thereby stably fastening the pressure vessel 100 in all directions. Further, a stress concentrated by a bracket which is fastened with the body 12 or the boss 16 is dispersed by fastening the pressure vessel 10 using the elastic body 100, thereby resolving a risk of reduced useful life and preventing deterioration of performance of the pressure vessel.

The plurality of elastic bodies 100 are pressed to the curved portions 14 of both ends of the pressure vessel 10 using the fixed structure 200. Referring to FIGS. 2 and 3, a force applied to the pressure vessel 10 by the elastic body 100 is divided into a length or horizontal $F_L$ component and a radial $F_R$ component. In this case, the force of the radial $F_R$ component is offset and the force of the horizontal $F_L$ component is applied in a C direction and is applied in an opposite direction to each other at both ends of the curved portion 14 to be in an equilibrium state of force, thereby fastening the pressure vessel 10.

When the fixed structure 200 is coupled with the vehicle body 400, the elastic body 100 is compressed to control a coupled position of the fixed structures 200 at left and right ends so that a preset compression load is applied to the elastic body 100. This is a compression stress applied to a contacted surface between the elastic body 100 and the curved portion 14 of the pressure vessel to more stably fasten the pressure vessel and still maintain a fastening force even in the state in which fuel is used up.

Referring to FIG. 4, the elastic body 100 may be configured to include a fixed part 110 connected to the fixed structure 200 and a support part 120 supporting the curved portion 14, in which the fixed part 110 has an upper end provided with a horizontal surface 111 which is horizontal to a ground and a side end provided with a vertical surface 112 which is vertical to the ground, the support part 120 is configured of a support curved surface 121 connecting between an end of the horizontal surface 111 and an end of the vertical surface 112 by a curved line, and the support curved surface 121 may be configured to contact the pressure vessel 10.

When the pressure vessel 10 is supported and fastened by the fixed structure 200, the force is delivered to the pressure vessel 10 by the support part 120 of the elastic body 100. In this case, the elastic body 100 is provided with the support curved surface 121 and thus the contacted part is not a line contact but a face contact to be expanded, thereby dispersing the force.

The horizontal surface 111 and the vertical surface 112 of the fixed part 110 of the elastic body 100 may effectively deliver the force of the horizontal component $F_L$ and the force of the vertical component FR, which are delivered from the pressure vessel 10 through the support part 120, to a band 201 of the fixed structure 200 and may be provided with the horizontal surface 111 to facilitate the coupling between the elastic body 100 and the band 201.

As illustrated in FIG. 5, the vertical surface 112, the horizontal surface 111, and the support curved surface 121 of the elastic body 100 form a closed cross section and a center of the elastic body 100 may be provided with a void portion 130 which may be filled with a foam 131.

When the vertical surface 112, the horizontal surface 111, and the support curved surface 121 of the elastic body 100 form the closed cross section, the elastic body 100 is molded in a long pipe shape and thus may be cut as much as a defined thickness, thereby increasing mass production. Further, in the case of controlling rigidity by filling the void portion 130 with the foam 131, the rigidity may be controlled without needing to produce the elastic body 100 having a separate standard, and thus production costs may be reduced. Further, the rigidity may also be controlled by controlling a kind of filled foam 131.

In the case of the elastic body 100, the applied load is changed depending on a position where the elastic body 100 is mounted in the vehicle. For example, as illustrated in FIG. 1, when four elastic bodies 100 are coupled with the curved portion 14 of one side of the pressure vessel 10, two elastic bodies 100 at a lower end of the pressure vessel 10 are applied with a greater load by the pressure vessel and the weight of stored fuel than the elastic body 100 at an upper end thereof and therefore are deformed by a larger amount. When unbalance of the deformation occurs, the unbalance occurs at the fixed position of the pressure vessel 10, such that the pressure vessel 10 may not be stably fastened. Therefore, the rigidity of the elastic body 100 at the lower end needs to be supplemented. To this end, a method for filling the void portion 130 of the elastic body 100 with the foam 131, a method for increasing the thickness of the horizontal surface 111 and the vertical surface 112 of the elastic body 100, etc., may be used. Alternatively, the rigidity may be reinforced by a method for reducing the loads applied to each elastic body 100 by increasing the number of elastic bodies 100 at the lower end.

As illustrated in FIG. 9, the fixed structure 200 may include the band 201 configured to penetrate through the elastic body 100 or be coupled with an outer side of the elastic body 100 to fasten the plurality of elastic bodies 100 and brackets 205 and 207 configured to be coupled with the band 201 to be fastened with the vehicle body 400.

The horizontal surface 111 of the elastic body 100 is disposed in the length direction of the pressure vessel 10, the vertical surface 112 thereof is disposed in the radial direction of the pressure vessel, and an inner side 202 of the band 201 may be coupled with the horizontal surface 111 of the elastic body 100 to support the pressure vessel.

In this case, the band 201 and the brackets 205 and 207 may configure the fixed structure 200. The assembling of the fixed structure 200 may be made in a structure in which the elastic body 100 is bonded, fused, or welded to the inner side 202 of the band 201, the band 201 stands between an upper part 205 and a lower part 207 of the bracket, and the outer side 203 of the band 201 is enclosed with an upper part 205 and a lower part 207 of the bracket (in the case of using a metallic elastic body 100, the fixed structure 200 may be directly coupled with the bracket by the welding, without the band 201. However, when the pressure vessel is made of carbon fiber, to prevent Galvanic corrosion with the carbon fiber, the metallic elastic body 100 needs to be subjected to surface treatment, coated, or attached with a rubber plate 122).

The strength applied to the elastic body 100 at the time of assembling the elastic body 100 with the pressure vessel may be set so that the stress applied to the elastic body 100 is about 50% of the breaking strength of the elastic body 100 when fuel is re-filled, and may be set so that a compression stress level is about 70% of the breaking strength of the elastic body 100 due to the expansion of the pressure vessel when fuel is fully charged. In particular, to prevent compression failure of the elastic body 100, the elastic body 100 needs to be designed so that the stress generated when fuel is filled and discharged is less than the compression strength. This is to prevent the fixed structure 200 from being destroyed even in the repeated process of returning the pressure vessel to the original compression stress level by the expansion due to the fuel filling of the vehicle and the contraction due to the fuel consumption, thereby securing safety.

As illustrated in FIGS. 4 to 6, the elastic body 100 is made of a composite material including a high strength fiber, the fiber of the composite material is included in the elastic body 100 in parallel in a circumferential direction of the elastic body 100, and an outer layer of the elastic body 100 is provided with a multi-directional woven fiber.

Referring to FIG. 6, when the elastic body 100 is not provided with the inner layer and the outer layer having the structure of the woven fiber 153, longitudinal cracks in fiber direction and delamination may occur while it is contacted and supported to the storage vessel. That is, the inner layer and the outer layer having the woven fiber 153 structure is formed in the elastic body 100 to prevent the crack and delamination.

The composite material has excellent fatigue performance against the repeated motion and therefore is suitable for the material of the elastic body 100. All fibers such as carbon fiber and glass fiber may be used, but the glass fiber having high elongation is most suitable at the time of considering the strain, etc., which the elastic body 100 should have. In the case of resin, thermosetting resin and thermoplastic resin may be applied. However, the thermoplastic resin has toughness stronger than that of the thermosetting resin and may be fused to the band 201 made of a composite material to have excellent moldability.

Figure 10:
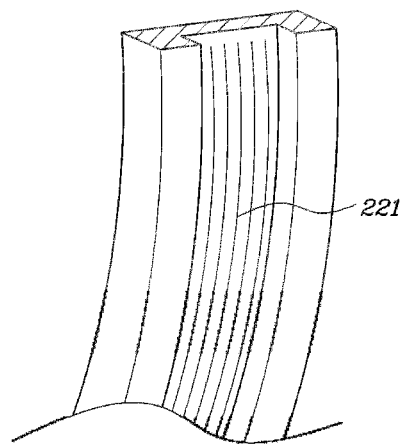
FIG. 10 is a cross-sectional view taken along the line B-B of a band of the apparatus for fastening a pressure vessel of a vehicle according to the exemplary embodiment of the present invention illustrated in FIG. 9.

As illustrated in FIG. 10, the band 201 is made of the composite material including a high strength fiber 221, in which the fiber of the composite material may be disposed in parallel in the circumferential direction of the band 201.

In the case of the band 201, the position of the elastic body 100 is stably maintained along the circumference of the curved portion 14, and therefore the carbon fiber having large rigidity is suitable.

As illustrated in FIGS. 1 and 2, the apparatus for fastening a pressure vessel of a vehicle further includes a dovetail-shaped mounting rail 300 configured to be provided at the vehicle body 400 and provided with grooves at a uniform interval, in which one side of the mounting rail 300 provided with grooves 301 may be coupled with the brackets 205 and 207 and the other side thereof may be coupled with the vehicle body 400.

The coupled position of the fixed structure 200 may be changed by controlling a bolt fastening position depending on the interval of the grooves 301 of the dovetail-shaped mounting rail 300, thereby providing convenience of assembly and preventing vertical and horizontal shaking. Further, the dovetail-shaped mounting rail 300 may be applied to absorb a length tolerance and a shape tolerance of a vessel dome portion which occur in each vessel. Further, even though the size of the outside of the pressure vessel 10 is changed due to the change in design, it is enough to change only the fastened position of the elastic body 100 and the fixed structure 200. Therefore, there is no need to consider the change in design of a mounting portion of the vehicle like the related art.

The coupling of the fixed structure 200 may be made by a method for directly fastening the brackets 205 and 207 to the vehicle body 400, but may be made by the dovetail-shaped mounting rail 300 having the grooves 301 at a uniform interval. The coupling of the brackets 205 and 207 with the dovetail-shaped mounting rail 300 is made by a method for passing bolts through bolt holes 209 which are provided at ends of the brackets 205 and 207 and inserting bodies of bolts into the grooves 301 of the dovetail-shaped mounting rail 300.

Referring to FIGS. 7 and 8, in the case of the elastic body 100, the horizontal surface 111 is provided with a seating groove 140 in which the band 201 is seated and the seating groove 140 may be configured of a lower surface portion 141 which faces-contact the inner side 202 of the band 201 and a side portion 142 which contacts the side of the band 201.

The bonding strength of the band 201 with the elastic body 100 does not rely on only the bonding, the fusing, and the welding but is supplemented by forming the seating groove 140 and the assembling performance may be facilitated by guiding the coupled position of the band 201.

A width of the lower surface portion 141 of the elastic body 100 is equal to that of the band 201 and the inner side 202 of the band 201 and the lower surface portion 141 of the elastic body 100 are coupled with each other while face-contacting each other.

Referring to FIG. 1, a storage system for a pressure vessel of a vehicle may include the pressure vessel 10 configured of the cylindrical body 12, the dome-shaped curved portions 14 at both ends of the cylindrical body 12, and the bosses 16 at the distal ends of the curved portions 14, the elastic bodies 100 configured to be disposed along circumferences of the curved portions 14 of the pressure vessel to support the surfaces of the curved portions 14 and to be disposed on the virtual flat cross section 18 vertically crossing the curved portions 14 along the circumferences of the curved portions 14 to support the curved portions of the pressure vessel in all directions, and the fixed structure 200 configured to have one side connected to the elastic body 100 and the other side connected to the vehicle body 400.

As described above, according to the apparatus for fastening a pressure vessel of the present invention, it is possible to resolve the risk of reduced useful life and prevent deterioration of performance of the pressure vessel by absorbing the contraction and expansion of the pressure vessel in the radial direction and the length direction and dispersing the stress concentrated between the curved portion and the boss of the bracket or the pressure vessel.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. An apparatus for fastening a pressure vessel of a vehicle, in which the pressure vessel includes a cylindrical body, dome-shaped curved portions at both ends of the cylindrical body, and bosses at distal ends of the curved portions, and is fixed to a vehicle body, the apparatus comprising:
   elastic bodies configured to be disposed along circumferences of the curved portions of the pressure vessel to support surfaces of the curved portions and support the curved portions of the pressure vessel in all directions; and
   a fixed structure configured to have one side connected to the elastic bodies and the other side connected to the vehicle body,
   wherein each of the elastic bodies is configured to include a fixed part connected to the fixed structure and a support part supporting one of the curved portions, the support part being configured as a support curved surface that connects different surfaces of the fixed part by a curved line, the support curved surface contacting the pressure vessel.

2. The apparatus of claim 1, wherein the fixed part is configured to have an upper end provided with a horizontal surface which is horizontal to a ground and a side end provided with a vertical surface which is vertical to the ground, the support curved surface connecting an end of the horizontal surface and an end of the vertical surface by the curved line.

3. The apparatus of claim 2, wherein the vertical surface, the horizontal surface, and the support curved surface of each of the elastic bodies form a closed cross section, and a center of each of the elastic bodies is provided with a void portion which is filled with a foam.

4. The apparatus of claim 1, wherein the fixed structure includes a band which penetrates through each of the elastic bodies or is coupled with an outer side of each of the elastic bodies, and brackets coupled with the band to be fastened with the vehicle body.

5. The apparatus of claim 1, wherein each of the elastic bodies is made of a composite material including a high strength fiber, the fiber of the composite material is included in each of the elastic bodies in parallel in a circumferential direction of each of the elastic bodies, and an inner layer and an outer layer of each of the elastic bodies is provided with a multi-directional woven fiber.

6. The apparatus of claim 4, wherein the band is made of the composite material including a high strength fiber and the fiber of the band is disposed in parallel in the circumferential direction of the band.

7. The apparatus of claim 2, wherein the fixed structure includes a band which penetrates through each of the elastic bodies or is coupled with an outer side of each of the elastic bodies, and
   the horizontal surface of each of the elastic bodies is disposed in a length direction of the pressure vessel, the vertical surface thereof is disposed in the radial direction of the pressure vessel, and an inner side of the band is coupled with the horizontal surface of each of the elastic bodies to support the pressure vessel.

8. The apparatus of claim 4, further comprising:
   a dovetail-shaped mounting rail configured to be provided at the vehicle body and provided with grooves at a uniform interval,
   wherein one side of the mounting rail provided with grooves is coupled with the brackets and the other side thereof is coupled with the vehicle body.

9. The apparatus of claim 2, wherein the fixed structure is provided with a band configured to penetrate through each of the elastic bodies or be coupled with an outer side of the elastic body to fasten the plurality of elastic bodies and the horizontal surface of the elastic body is provided with a seating groove in which the band is seated and the seating groove is configured of a lower surface portion which faces-contact the inner side of the band and a side portion which contacts the side of the band.

10. A pressure vessel fastening system of a vehicle, comprising:
   a pressure vessel configured to include a cylindrical body, dome-shaped curved portions at both ends of the cylindrical body, and bosses at distal ends of the curved portions;
   elastic bodies configured to be disposed along circumferences of the curved portions of the pressure vessel to support surfaces of the curved portions and support the curved portions of the pressure vessel in all directions; and
   a fixed structure configured to have one side connected to the elastic bodies and the other side connected to the vehicle body,
   wherein each of the elastic bodies is configured to include a fixed part connected to the fixed structure and a support part supporting one of the curved portions, the support part being configured as a support curved surface that connects different surfaces of the fixed part by a curved line, the support curved surface contacting the pressure vessel.

* * * * *